(12) United States Patent
Gauss et al.

(10) Patent No.: US 11,187,355 B2
(45) Date of Patent: Nov. 30, 2021

(54) FLUID COUPLING AND METHOD OF ASSEMBLY

(71) Applicant: Eaton Intelligent Power Limited, Dublin (IE)

(72) Inventors: Jason C. Gauss, Jackson, MI (US); Donald K. Benko, Lakewood, OH (US); Li Yu, Pittsburgh, PA (US); Xin Zhou, Wexford, PA (US); Sumit Varma, Maharahtra (IN)

(73) Assignee: Eaton Intelligent Power Limited, Dublin (IE)

( * ) Notice: Subject to any disclaimer, the term of this patent is extended or adjusted under 35 U.S.C. 154(b) by 529 days.

(21) Appl. No.: 15/752,667

(22) PCT Filed: Jul. 22, 2016

(86) PCT No.: PCT/US2016/043642
§ 371 (c)(1),
(2) Date: Feb. 14, 2018

(87) PCT Pub. No.: WO2017/034715
PCT Pub. Date: Mar. 2, 2017

(65) Prior Publication Data
US 2018/0238477 A1   Aug. 23, 2018

Related U.S. Application Data

(60) Provisional application No. 62/208,151, filed on Aug. 21, 2015, provisional application No. 62/262,119, filed on Dec. 2, 2015.

(51) Int. Cl.
*F16L 19/00* (2006.01)
*F16L 33/22* (2006.01)
(Continued)

(52) U.S. Cl.
CPC ......... *F16L 19/005* (2013.01); *F16L 19/0218* (2013.01); *F16L 19/0286* (2013.01); *F16L 33/223* (2013.01); *F16L 37/101* (2013.01)

(58) Field of Classification Search
CPC . F16L 19/005; F16L 19/0218; F16L 19/0286; F16L 37/101; F16L 33/223
(Continued)

(56) References Cited

U.S. PATENT DOCUMENTS

| RE23,586 E | 11/1952 | Merriman |
|---|---|---|
| 2,934,359 A | 4/1960 | Smisko et al. |

(Continued)

FOREIGN PATENT DOCUMENTS

| EP | 0441683 A1 | 8/1991 |
|---|---|---|
| GB | 2270805 A | 3/1994 |
| WO | 2015119948 A1 | 8/2015 |

OTHER PUBLICATIONS

International Search Report, PCT/US2016/043642, dated Oct. 4, 2016.

*Primary Examiner* — Zachary T Dragicevich
(74) *Attorney, Agent, or Firm* — Fishman Stewart PLLC

(57) ABSTRACT

Fluid coupling (10), comprising: a first member (20) configured for connection with a first fluid conduit (16); a second member (30) configured for connection with a second fluid conduit (18); a nut (50) disposed at least partially around the first member (20), the nut (50) configured to engage the second member (30); and a sleeve (60) configured to rotate the nut (50) and cause or facilitate engagement between the nut (50) and the second member (30).

15 Claims, 17 Drawing Sheets

(51) Int. Cl.
*F16L 19/02* (2006.01)
*F16L 19/028* (2006.01)
*F16L 37/10* (2006.01)

(58) Field of Classification Search
USPC .................................................. 285/86, 92
See application file for complete search history.

(56) References Cited

U.S. PATENT DOCUMENTS

| | | |
|---|---|---|
| 3,201,859 A | 8/1965 | Stanley |
| 3,390,900 A | 7/1968 | McCormick et al. |
| 4,655,482 A * | 4/1987 | Myers ................... F16L 19/005 |
| 5,127,679 A * | 7/1992 | Pouplier ............... F16L 19/005 |
| | | 285/86 |
| 5,215,336 A * | 6/1993 | Worthing ............. F16L 19/005 |
| | | 285/92 |
| 5,348,349 A * | 9/1994 | Sloane ................. F16L 19/005 |
| | | 285/86 |
| 5,882,044 A * | 3/1999 | Sloane ................. F16L 19/005 |
| | | 285/92 |
| 7,222,889 B2 | 5/2007 | Breay |
| 2002/0008386 A1 | 1/2002 | Lee |
| 2006/0151994 A1 | 7/2006 | Marc et al. |
| 2010/0084856 A1 | 4/2010 | Wrobel et al. |
| 2012/0267456 A1* | 10/2012 | Imagawa ............. F16L 19/005 |
| | | 285/86 |
| 2015/0316087 A1* | 11/2015 | Hyzin .................. F16L 19/005 |

\* cited by examiner

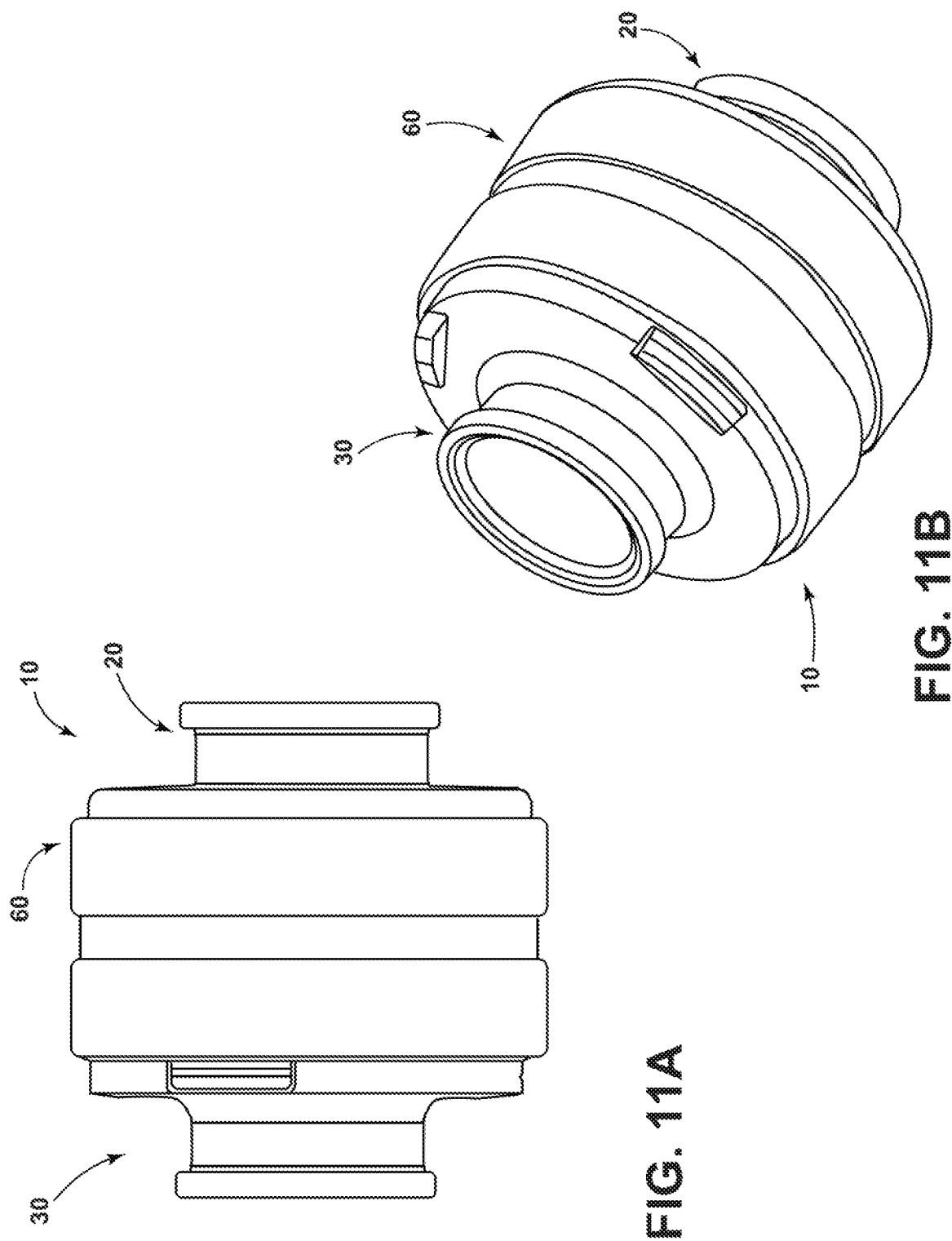

FLUID COUPLING AND METHOD OF ASSEMBLY

CROSS-REFERENCE TO RELATED APPLICATIONS

This application is a National Stage Patent Application of International Patent Application No. PCT/US2016/043642, filed Jul. 22, 2016, which claims the benefit of U.S. Provisional Application Ser. No. 62/208,151, filed Aug. 21, 2015, and U.S. Provisional Application Ser. No. 62/262,119, filed Dec. 2, 2015, the contents of the foregoing are incorporated herein by reference in their entireties.

TECHNICAL FIELD

The present disclosure generally relates to a coupling for connecting two members together, including a quick disconnect coupling, and methods related thereto.

BACKGROUND

Examples of some conventional coupling assemblies are generally described in U.S. Pat. Nos. 5,553,895, 5,570,910, 6,494,494, and/or 6,592,151, each of which is assigned to the assignee hereof and each of which is hereby incorporated by reference as though fully set forth herein. Certain conventional coupling assemblies may be relatively large, heavy, and/or difficult to assemble (e.g., may require tools).

SUMMARY

Embodiments of the present disclosure include a quick disconnect coupling. In embodiments, a coupling assembly may include a first member and a second member. The second member may include external threads. The coupling assembly may include a nut that may be disposed at least partially around the first member. The nut may comprise internal threads that may be configured to engage the external threads of the second member. The coupling assembly may include a sleeve that may be configured to rotate the nut, which may cause engagement between the internal threads and the external threads.

BRIEF DESCRIPTION OF THE DRAWINGS

FIGS. 11A and 11B are perspective views of portions of a coupling, in accordance with an embodiment of the present disclosure;

DETAILED DESCRIPTION

Figure 1:
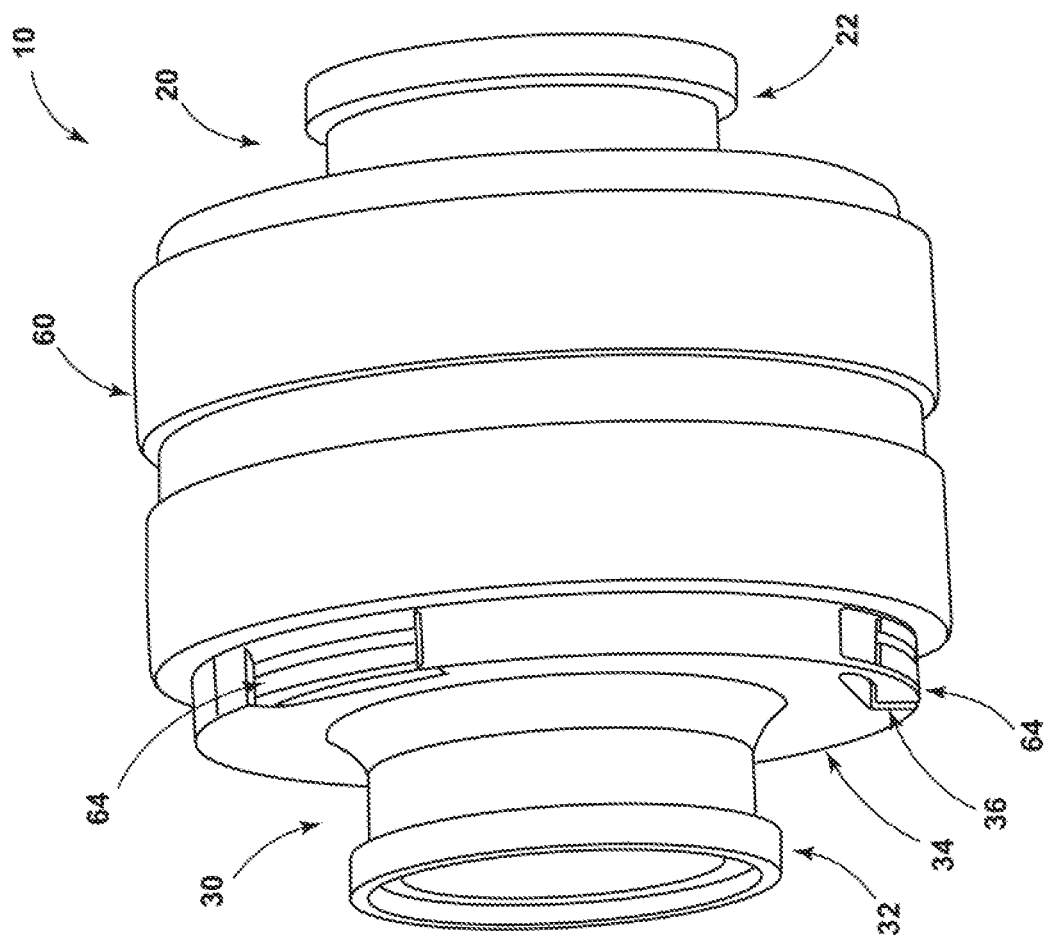
FIG. 1 is a cross-sectional view generally illustrating portions of a coupling, in accordance with an embodiment of the present disclosure.
Figure 2A:
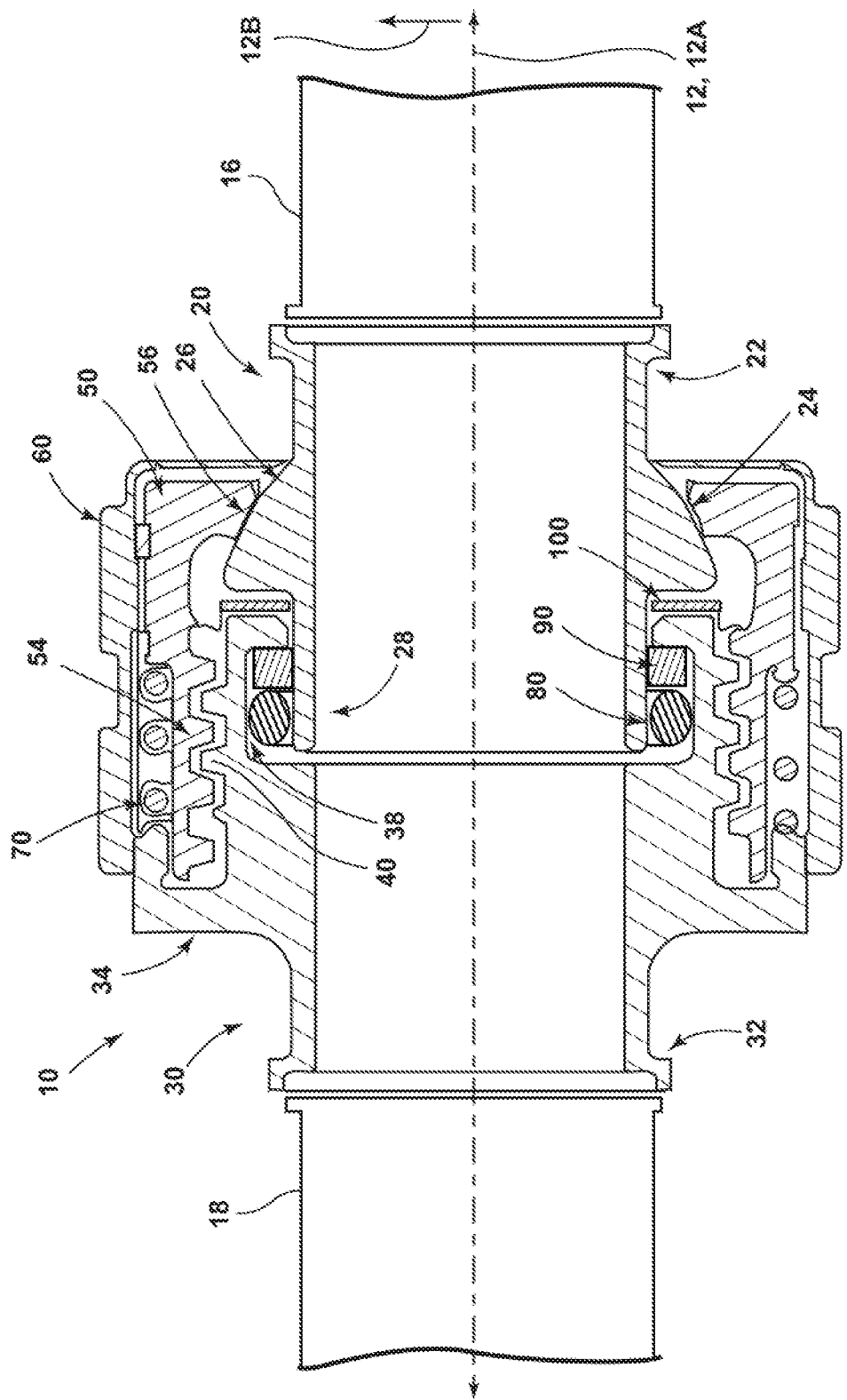
FIG. 2A is a cross-sectional view generally illustrating portions of a coupling, in accordance with an embodiment of the present disclosure.
Figure 2B:
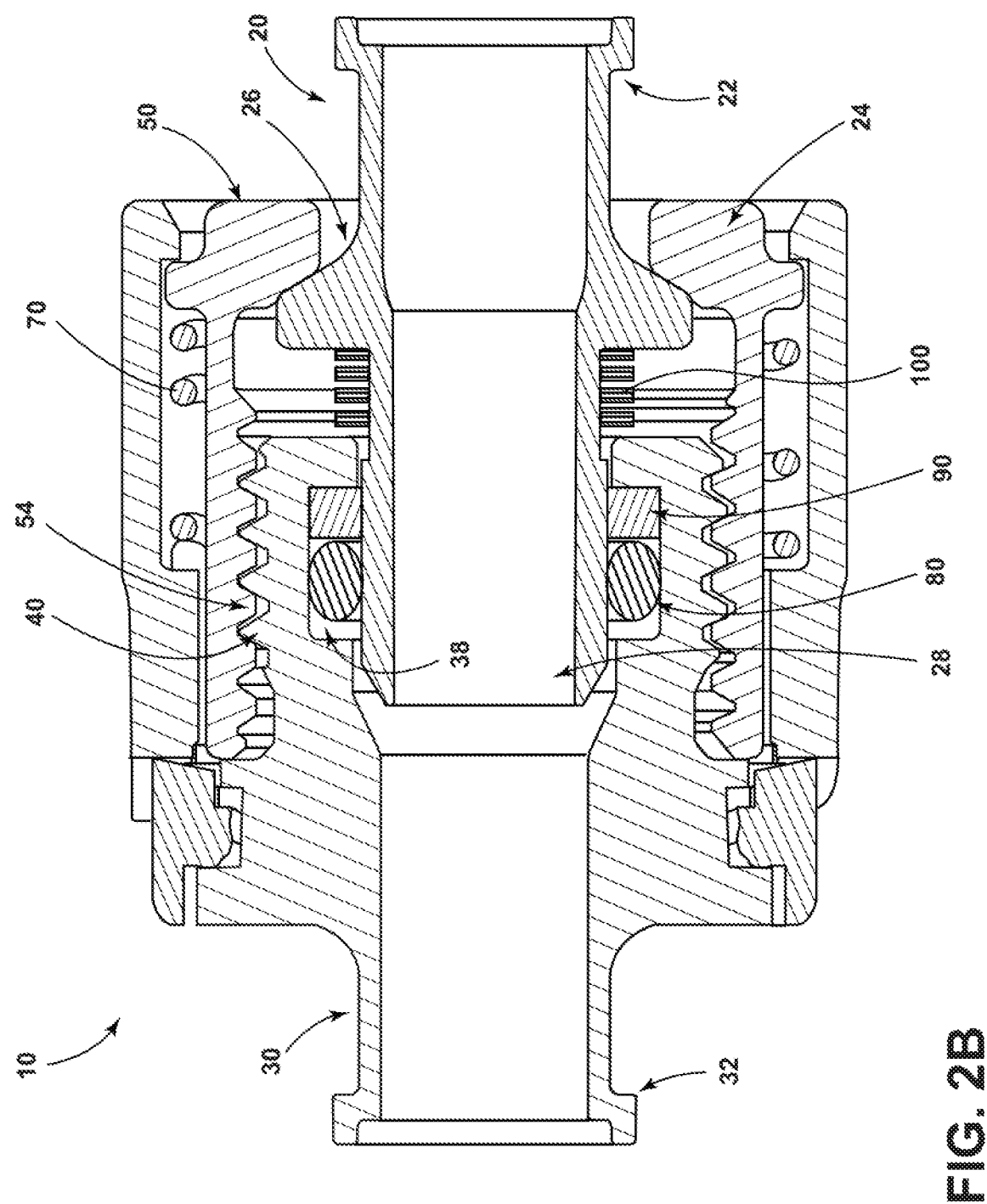
FIG. 2B is a cross-sectional view generally illustrating portions of a coupling in accordance with another embodiment of the present disclosure.

Referring now to the drawings, FIGS. 1, 2A, and 2B generally illustrate a hose tube fitting or a coupling 10, which may include a first member 20, a second member 30, a nut 50, and/or a sleeve 60. In embodiments, coupling 10 may include one or more of a variety of shapes, sizes, and/or configurations. For example, and without limitation, coupling 10 may include a generally cylindrical shape. In embodiments, coupling 10 may be configured to connect a first fluid conduit 16 and a second fluid conduit 18, which may include providing fluid communication and/or an electrical connection between first fluid conduit 16 and second fluid conduit 18. Coupling 10 may include a central axis 12, an axial direction 12A that may be generally parallel to central axis 12, and/or a radial direction 12B that may be generally perpendicular to the axial direction 12A and/or central axis 12.

Figure 3:
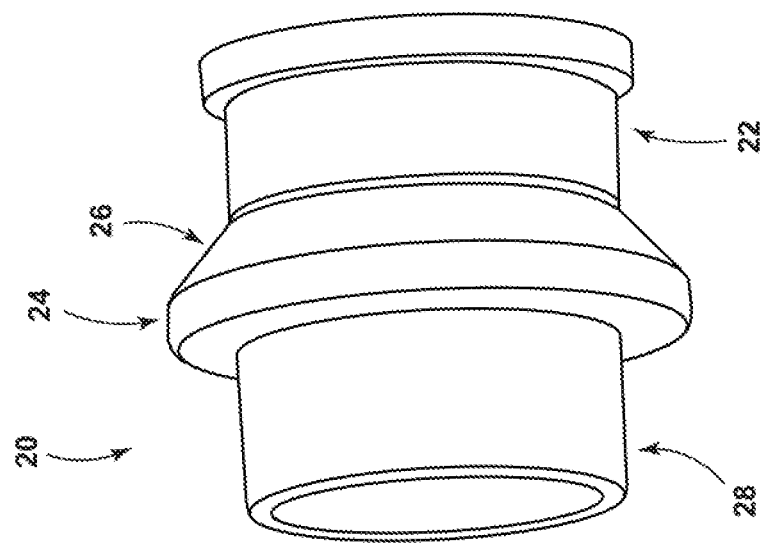
FIG. 3 is a perspective view generally illustrating portions of a first member, in accordance with an embodiment of the present disclosure.
Figure 5:
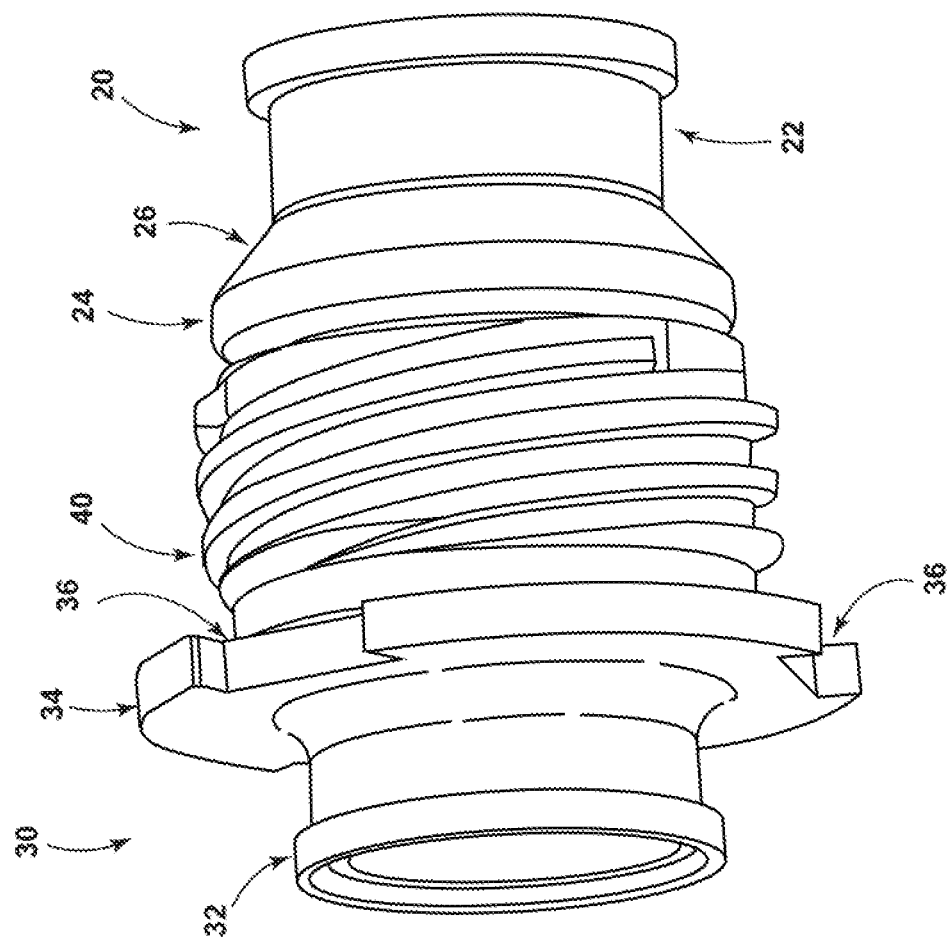
FIG. 5 is a perspective view generally illustrating portions a first member and a second member of a coupling, in accordance with an embodiment of the present disclosure.

In embodiments, such as generally illustrated in FIG. 3, first member 20 may include one or more of a variety of shapes, sizes, configurations, and materials. For example, and without limitation, first member 20 may include a generally cylindrical shape. In embodiments, first member 20 may include a fluid conduit connection portion 22, a flange 24, and/or a sealing portion 28. Fluid conduit connection portion 22 may be configured to connect with a fluid conduit, such as first fluid conduit 16, as generally illustrated in FIG. 2A. Fluid conduit connection portion 22 may be connected to first fluid conduit 16 in one or more of a variety of ways, such as, for example, via an orbital weld joint. In embodiments, sealing portion 28 may be configured to be inserted into (e.g., may include a smaller diameter than) second member 30. In embodiments, flange 24 may include a generally convex and/or curved portion 26 that may face generally axially outward (e.g., toward fluid conduit connection portion 22). Such a configuration may allow for first member 20 to move, at least to some degree, relative to nut 50, in an assembled configuration of coupling 10.

Figure 4:
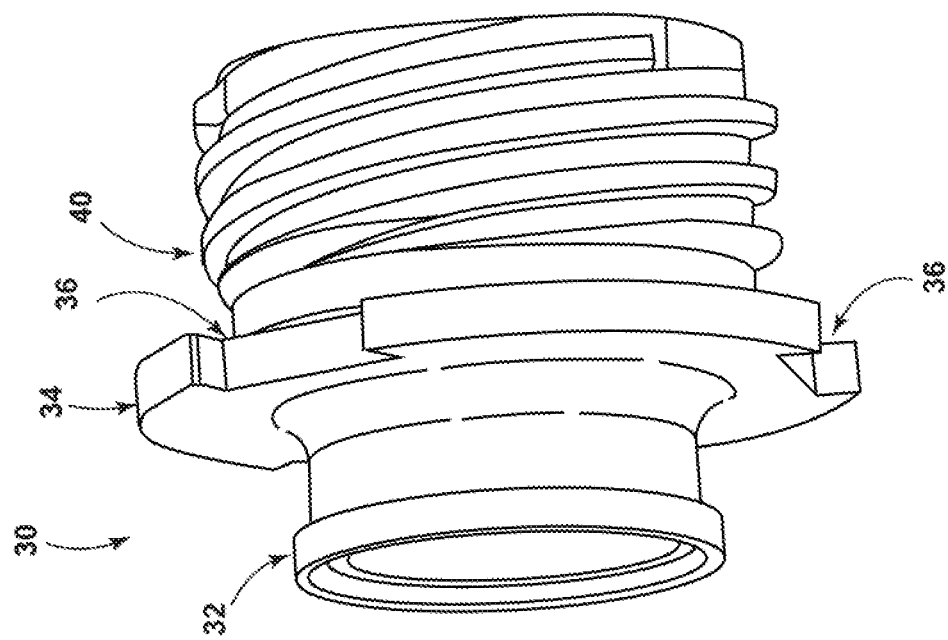
FIG. 4 is a perspective view generally illustrating portions of a second member, in accordance with an embodiment of the present disclosure.

In embodiments, such as generally illustrated in FIG. 4, second member 30 may include one or more of a variety of shapes, sizes, configurations, and materials. For example, and without limitation, second member 30 may include a generally cylindrical shape. In embodiments, second member 30 may include a fluid conduit connection portion 32, a flange 34, and/or a sealing portion 38. In embodiments, fluid conduit connection portion 32 may be configured to connect with a fluid conduit, such as second fluid conduit 18, such as generally illustrated in FIG. 2A. Fluid conduit connection portion 32 may be connected to second fluid conduit 18 in one or more of a variety of ways, such as, for example, via an orbital weld joint. In embodiments, sealing portion 38 may be configured to receive at least a portion of (e.g., may include a greater inner diameter than the outer diameter of) first member 20, such as sealing portion 28 of first member 20, such as generally illustrated in FIG. 2B. In embodiments, sealing portion 38 of second member 30 may include external threads 40 (e.g., multi-lead threads or three-lead threads) that may be configured for engagement with internal threads 54 of nut 50.

In embodiments, flange 34 of second member 30 may extend generally in the radial direction 12B and/or may include one or more recesses 36 that may be circumferentially spaced (e.g., equidistantly) around the exterior of flange 34. In embodiments, flange 34 may be configured to be integral to, pressed onto and/or snap fit with the second member 30, such as generally illustrated in FIGS. 2B, 2C, and 10C.

Figure 10A:
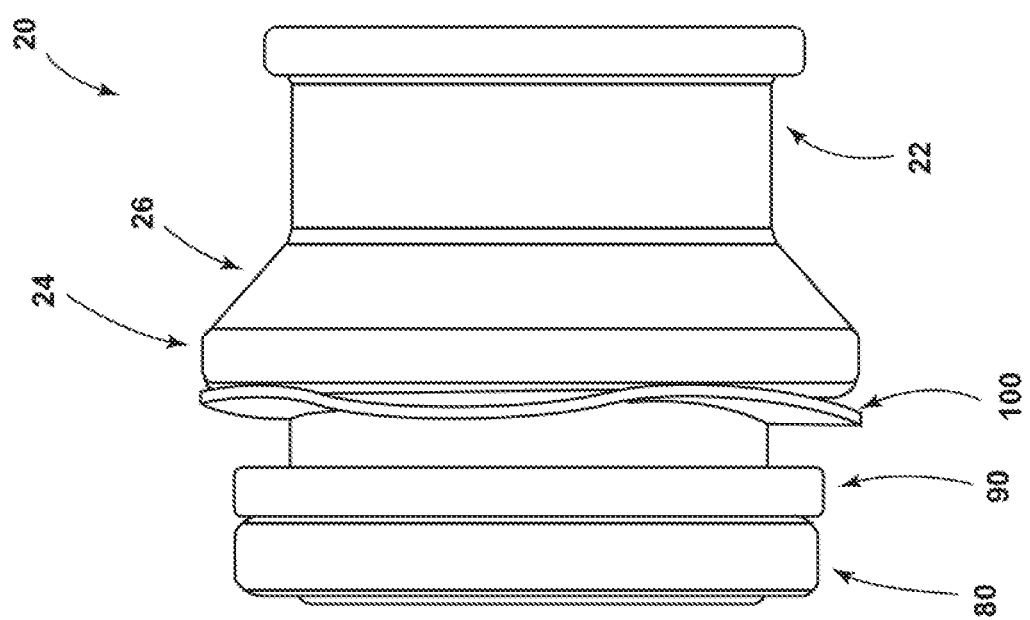
FIG. 10A is a side view generally illustrating portions of a first member, a wave spring, an elastomeric seal, and a backup ring, in accordance with an embodiment of the present disclosure.
Figure 10B:
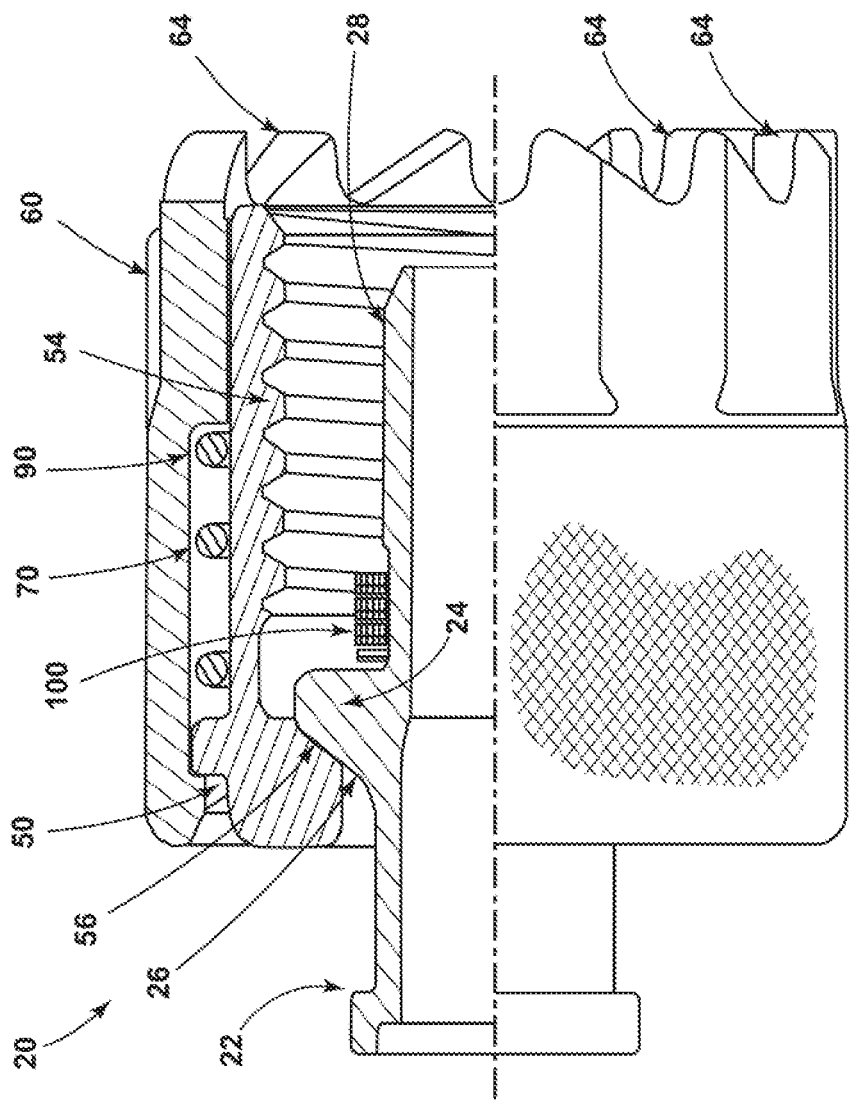
FIG. 10B is a cross-sectional view generally illustration portions of a coupling, in accordance with another embodiment of the present disclosure.
Figure 10C:
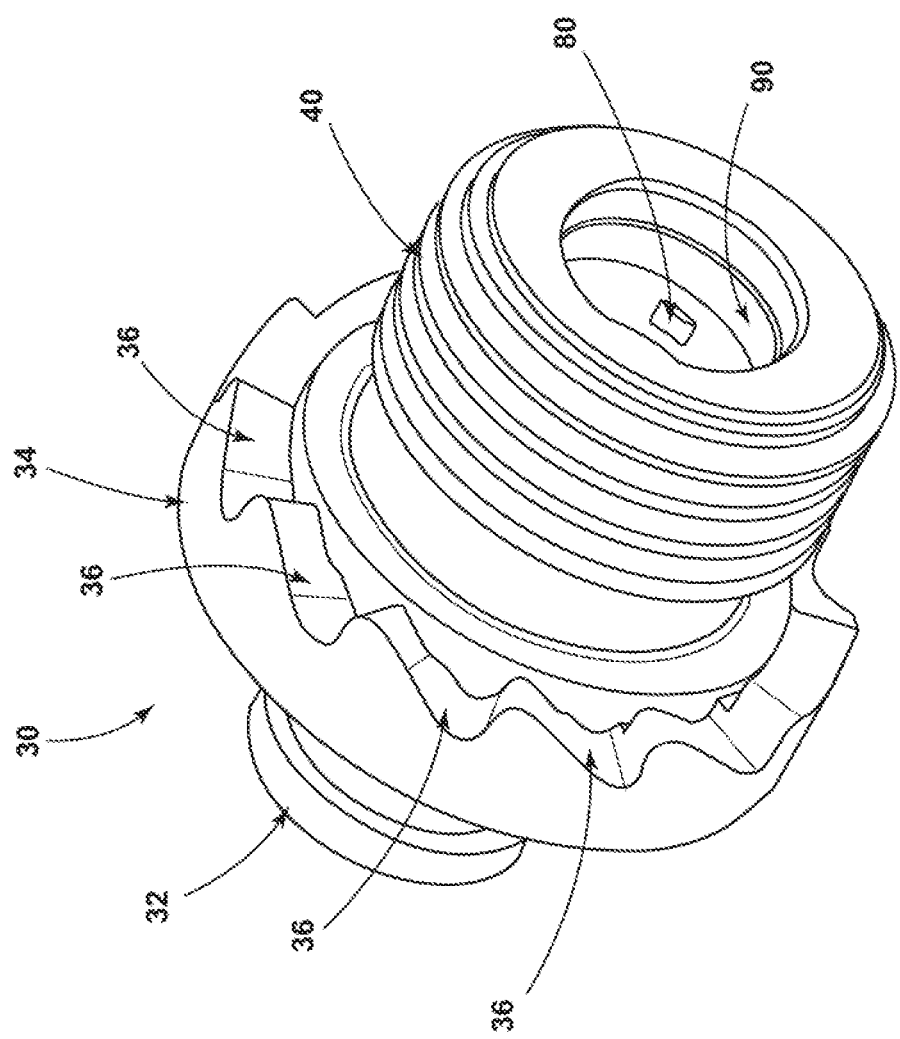
FIG. 10C is a cross-sectional view generally illustration portions of a coupling, in accordance with another embodiment of the present disclosure.

In other embodiments, the coupling 10 may include a separate flange portion (see, e.g., FIG. 10C). The separate flange portion may comprise the flange 34. As described, the flange 34 may include one or more recesses 36. The separate flange portion may be configured to be pressed onto and/or snap fit with second member 30. By way of non-limiting example, second member 30 may be a configured to receive a flange 34 as opposed to second member 30 comprising a flange 34. In embodiments, recesses 36 may be configured to receive at least a portion of sleeve 60, such as tabs 64 of sleeve 60 (see, e.g., FIG. 10B).

Figure 2C:
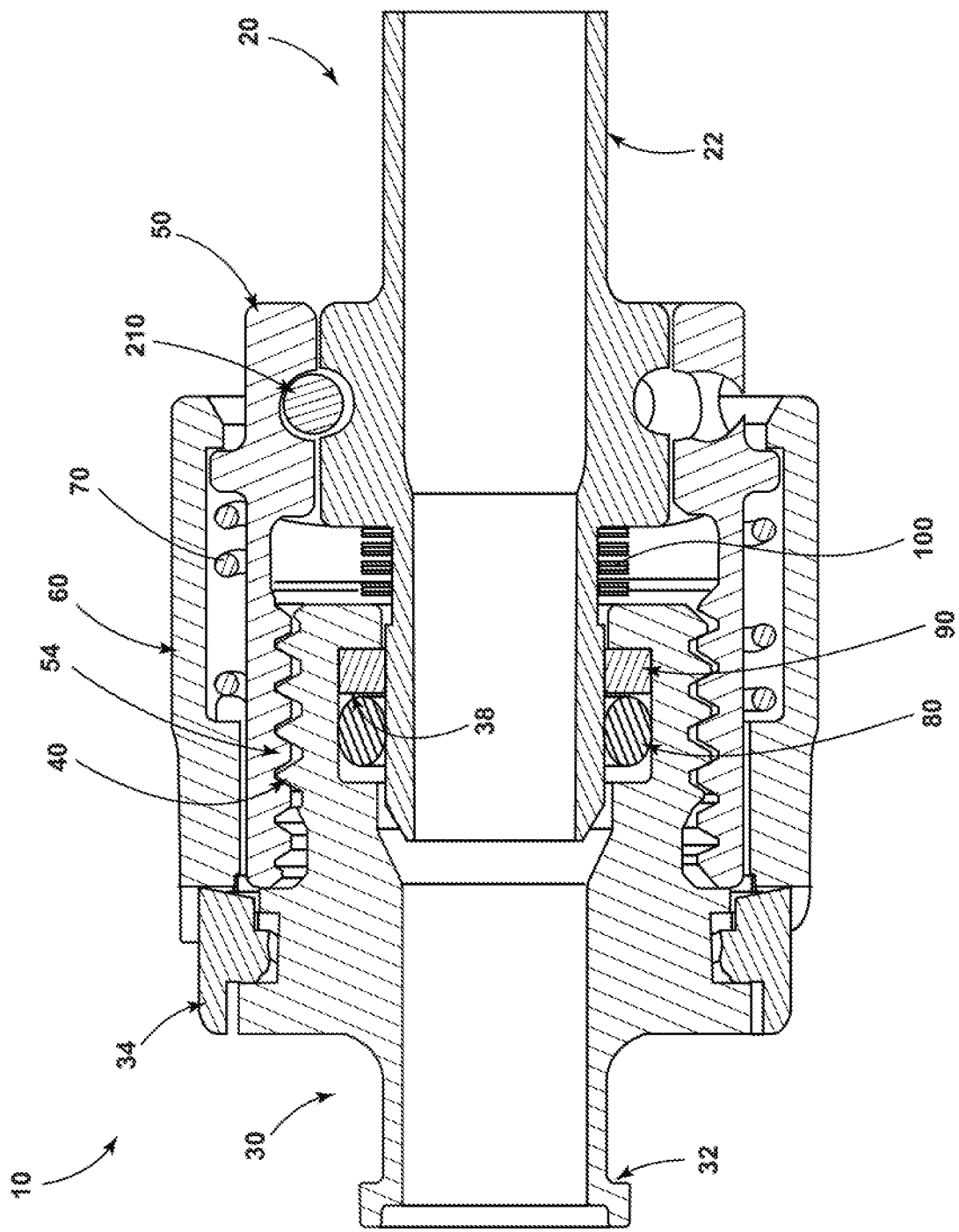
FIG. 2C is a cross-sectional view generally illustrating portions of a coupling in accordance with another embodiment of the present disclosure.

In embodiments, such as generally illustrated in FIG. 2C, nut 50 and/or sleeve 60 may be connected to first member 20 by way of a drive wire 210. In other embodiments, the nut 50 and/or sleeve 60 may be connected to first member 20 by way of other suitable mechanisms, such as, by way of non-limiting example, a snap-ring, an e-clip, and/or other mechanisms.

Figure 6:
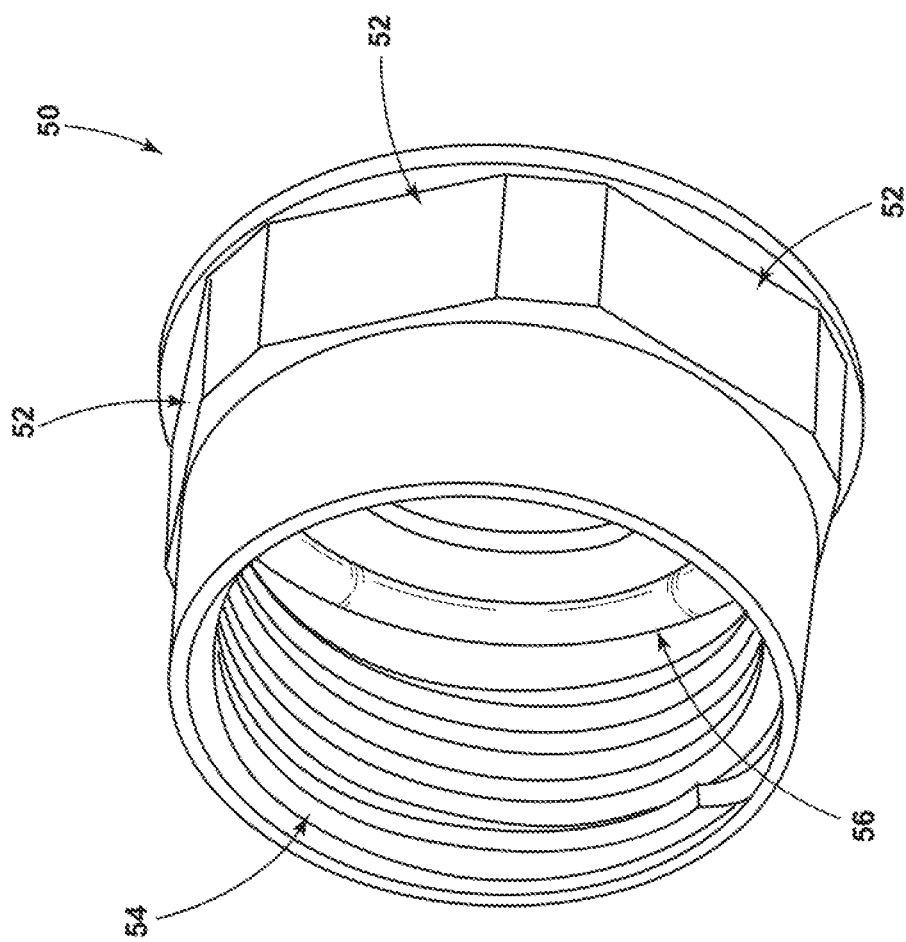
FIG. 6 is a perspective view generally illustrating portions of a nut, in accordance with an embodiment of the present disclosure.
Figure 7:
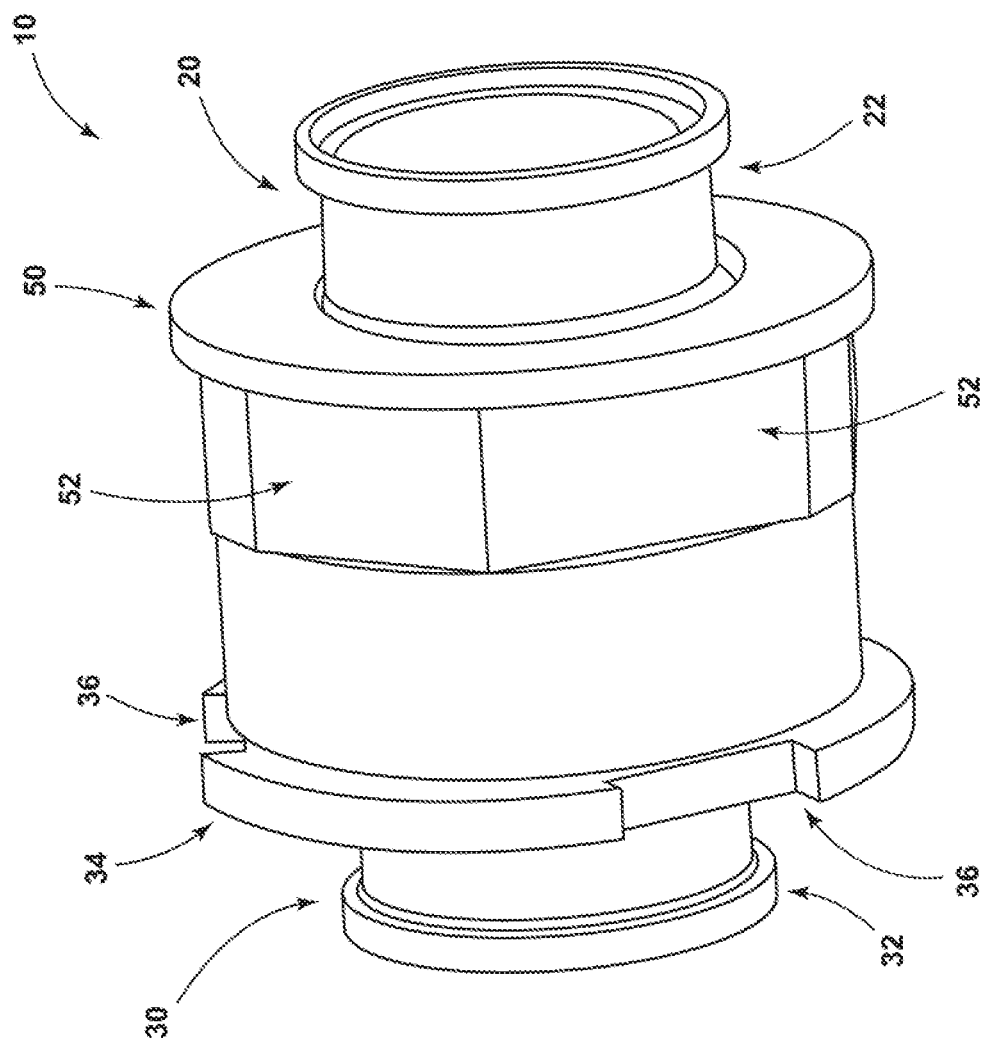
FIG. 7 is a perspective view of portions of a first member, a second member, and a nut, in accordance with an embodiment of the present disclosure.

In embodiments, such as generally illustrated in FIGS. 6 and 7, nut 50 may include one or more of a variety of shapes, sizes, configurations, and materials. For example, and without limitation, nut 50 may include a generally cylindrical shape. In embodiments, nut 50 may include one or more external flat portions 52 that may be disposed around the circumference of nut 50. In other embodiments, nut 50 may include one or more external flat portions 52 that may be disposed around the circumference of nut 50 such that a least a portion of nut 50 includes a generally hexagonal external shape.

In embodiments, external flat portions 52 of nut 50 may correspond to internal flat portions 62 of sleeve 60, which may include being configured to engage and/or be rotated via internal flat portions 62 of sleeve 60. In embodiments, nut 50 may include internal threads 54 that may be configured to engage external threads 40 of second member 30. In embodiments, nut 50 may include an internal curved portion 56 that may correspond to and/or be configured to abut flange 24 of first member 20. The interface between curved portion 56 of nut 50 and first member flange 24, may allow for first member 20 to move, at least to some degree, relative to nut 50.

Figure 8A:
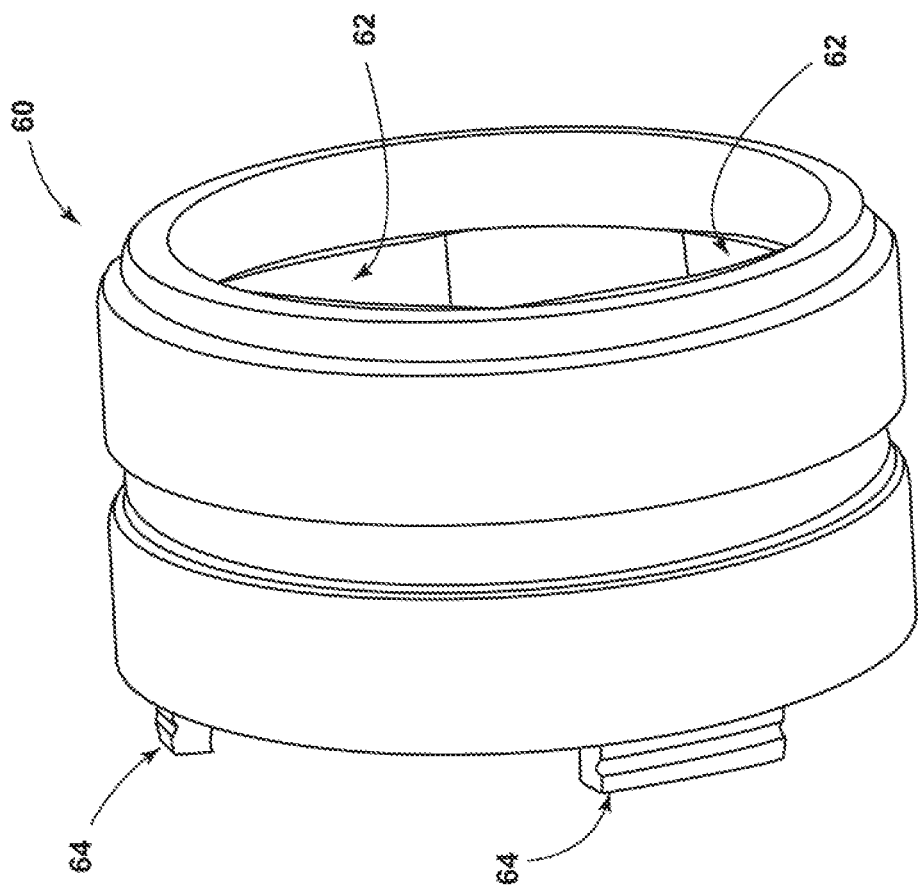
FIGS. 8A and 8B are perspective views of portions of a sleeve, in accordance with an embodiment of the present disclosure.
Figure 8B:
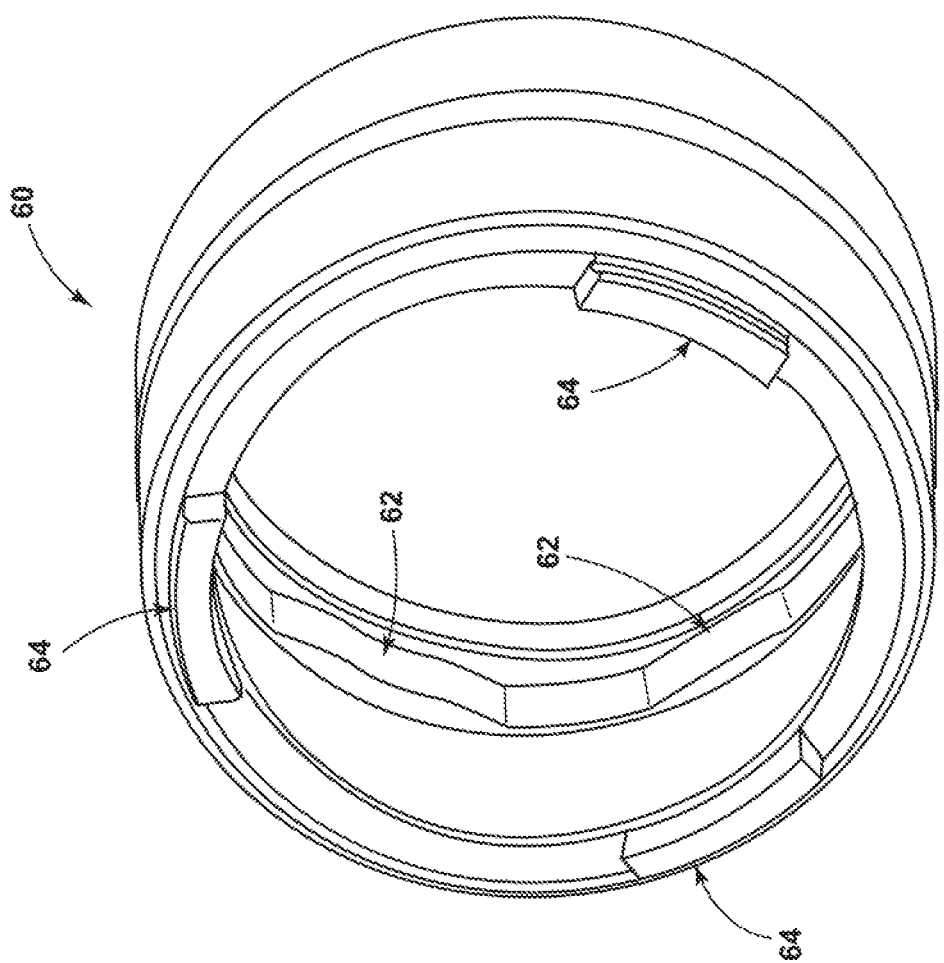

In embodiments, such as generally illustrated in FIGS. 8A and 8B, sleeve 60 may include one or more of a variety of shapes, sizes, configurations, and materials. For example, and without limitation, sleeve 60 may include a generally cylindrical shape and/or may be configured to slide over at least a portion of first member 20, second member 30, and/or nut 50 In embodiments, the sleeve 60 may be retained through any number of methods (e.g., snap-fit, forming, etc.). In embodiments, sleeve 60 may include internal flat portions 62 that may be configured, upon rotation of sleeve 60, to cause rotation of nut 50 via external flat portions 52. In other embodiments, sleeve 60 may include internal flat portions 62 that may be disposed in hexagonal configuration and may be configured, upon rotation of sleeve 60, to cause rotation of nut 50 via external flat portions 52. In embodiments, sleeve 60 may include one or more tabs 64 that may be configured to be at least partially inserted into and/or snap into corresponding recesses 36 of second member flange 34. Complete insertion of tabs 64 into recesses 36 may provide tactile, audible, and/or visual feedback of a completed assembly of coupling 10.

Figure 9:
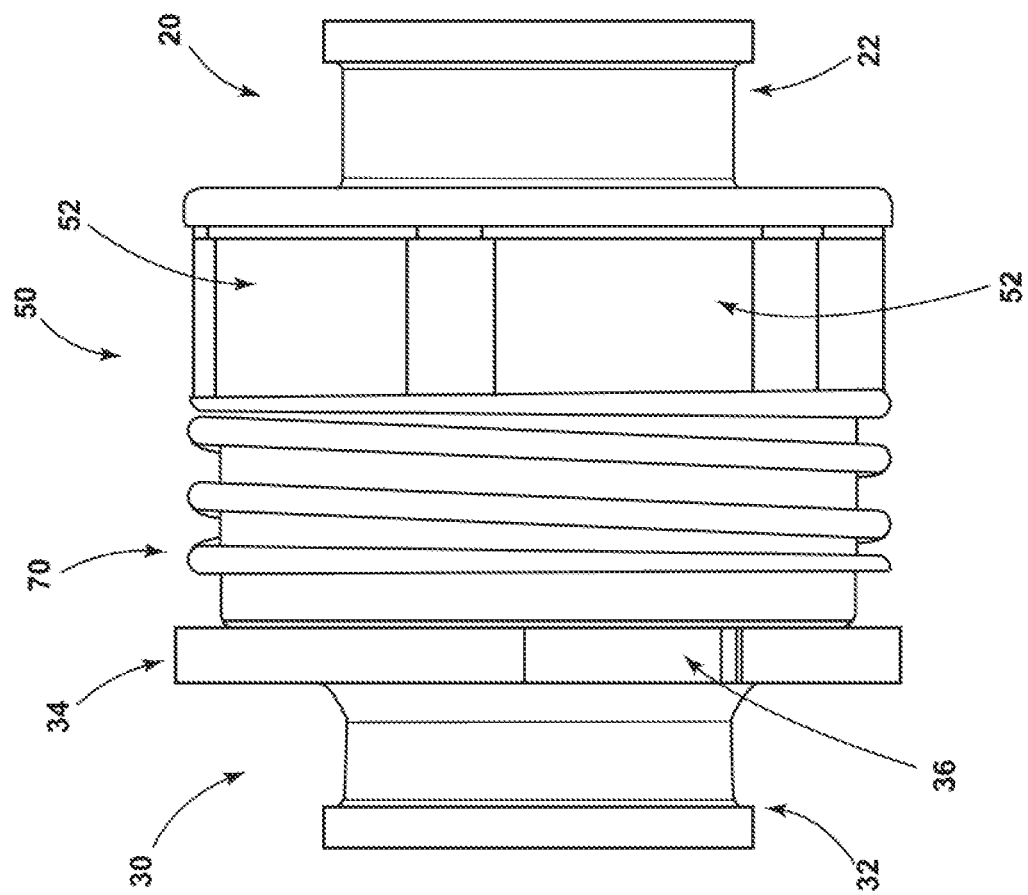
FIG. 9 is a side view generally illustrating portions of a first member, a second member, a nut, and a spring, in accordance with an embodiment of the present disclosure.

In embodiments, such as generally illustrated in FIG. 9, coupling 10 may include a spring 70, such as for example, a coil spring. Spring 70 may be disposed around the exterior of nut 50. Spring 70 may be disposed such that it applies a biasing force in the axial direction 12A between nut 50 and sleeve 60, which may help maintain engagement of tabs 64 with corresponding recesses 36 of second member flange 34, which may prevent (and/or reduce the likelihood of) the internal threads 54 of nut 50 from disengaging from the external threads 40 of second member 30 (e.g., prevent first member 20 and second member 30 from disconnecting from each other).

In embodiments, such as generally illustrated in FIG. 10A, coupling 10 may include an elastomeric seal 80 that may be generally annular and may be disposed around sealing portion 28 of first member 20. Elastomeric seal 80 may be configured to provide a fluid seal between first member 20 and second member 30. In embodiments, elastomeric seal 80 may be configured, upon insertion of first member 20 into second member 30, to be disposed between the outer diameter of first member sealing portion 28 and the inner diameter of second member sealing portion 38. In embodiments, it may be desirable to dispose elastomeric seal 80 as close as possible to curved portion 26 of first member flange 24 to maintain and/or minimize compression of elastomeric seal 80 during movement of first member 20.

In embodiments, such as generally illustrated in FIG. 10A, coupling 10 may include a backup ring 90. In embodiments, backup ring 90 may be configured to provide a fluid seal between first member 20 and second member 30, such as in addition to the fluid seal that may be provided by elastomeric seal 80. Backup ring 90 may be desirable in embodiments, such as those in which fluid pressures are expected to reach and/or exceed 1200 psi. In embodiments, backup ring 90 may include one or more of a variety of shapes, sizes, configurations, and materials. For example, and without limitation, backup ring 90 may include one or more synthetic polymers, such as polytetrafluoroethylene, also known as Teflon®, commercially available from DuPont, Co. In embodiments, backup ring 90 may be configured, upon insertion of first member 20 into second member 30, to be disposed between the outer diameter of first member sealing portion 28 and the inner diameter of second member sealing portion 38. In embodiments, backup ring 90 may be disposed axially outside of elastomeric seal 80 (e.g., closer to fluid conduit connection portion 22 of first member 20).

In embodiments, such as generally illustrated in FIG. 10A, coupling 10 may include a biasing member (e.g., a wave spring/spring washer 100). In embodiments, wave spring 100 may be disposed around the outside of sealing portion 28 of first member 20. Wave spring 100 may be configured to provide a biasing force along the axial direction 12A between first member 20 and second member 30 (e.g., between first member flange 24 and an axial end of second member sealing portion 38). Additionally or alternatively, wave spring 100 may be electrically conductive and may be configured to electrically connect first member 20 and second member 30. An electrically conductive wave spring 100 may be desirable, for example, in embodiments in which a sealing interface between first member 20 and second member 30 may be via elastomeric seal 80, which may not be electrically conductive and may not electrically connect first member 20 and second member 30. In other embodiments, one or both of elastomeric seal 80 and backup ring 90 may include one or more electrically conductive materials. In embodiments, wave spring 100 may be disposed axially outside of elastomeric seal 80 and/or backup ring 90 (e.g., closer to fluid conduit connection portion 22 of first member 20). In embodiments, wave spring 100 may allow for tolerance stack up (e.g., dimensional forgiveness), such as, for example, between first member 20 and second member 30.

Figure 10D:
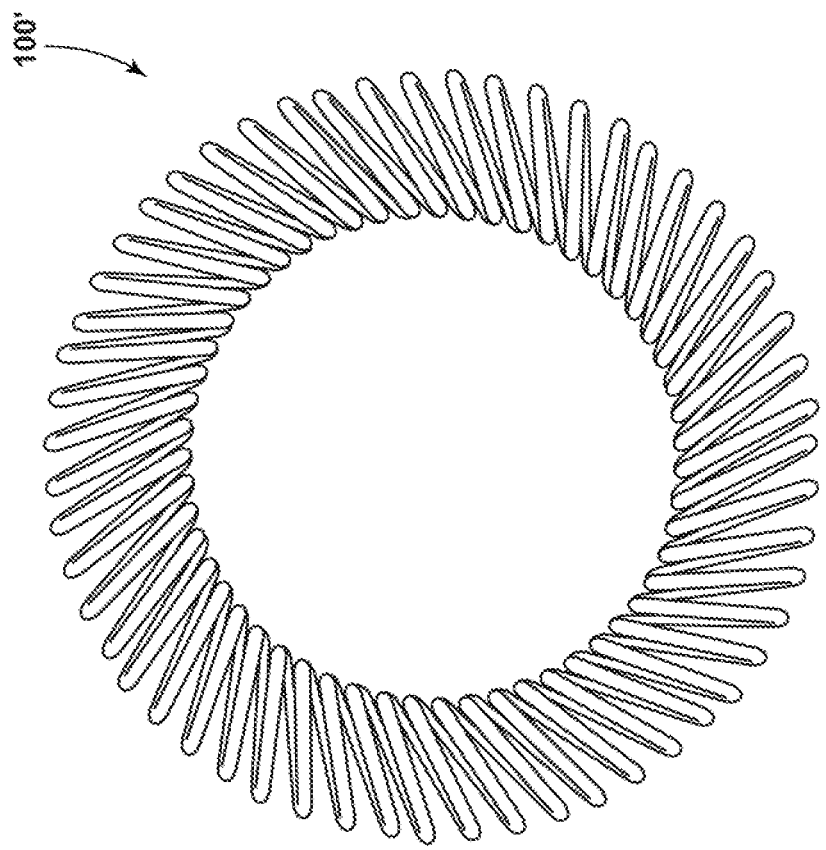
FIG. 10D is a side view generally illustrating portions of a garter spring, in accordance with an embodiment of the present disclosure.

In embodiments, such as generally illustrated in FIG. 10D, coupling 10 may include a biasing member 100' that may be in place of biasing member 100 or in addition to biasing member 100. Biasing member 100' may include, for example, a garter spring and/or may be referred to herein as garter spring 100', but biasing member 100' is not limited to a garter spring. A garter spring 100' may comprise a coiled metal (e.g., steel) spring that is connected at each end to create a circular shape. A garter spring 100' may be comprised, for example, of carbon steel or stainless steel wire, which can provide electrical conductivity. A garter spring may provide improved resistance characteristics relative to other biasing devices.

With embodiments, garter spring 100' may be disposed around the outside of sealing portion 28 of first member 20. Garter spring 100' may be configured to provide a biasing force along the axial direction 12A between first member 20 and second member 30 (e.g., between first member flange 24 and an axial end of second member sealing portion 38). Additionally or alternatively, garter spring 100' may be electrically conductive and may be configured to electrically connect first member 20 and second member 30.

Garter spring 100' may be configured for axial and/or radial contact. Contact resistance between a male and a female adapter can typically be minimized by one or more factors, which may include contact force, bulk connector resistivity, and the number of contact points. While other connector solutions have targeted the maximization of contact force, among other things, biasing member 100' may increase the number of contact points significantly/dramatically, which may reduce and/or minimize contact resistance.

In embodiments, such as generally illustrated in FIG. 10B, second member 30 may be configured to be pressed onto and/or snap fitted with first member 20. As described, sealing portion 38 of second member 30 may be configured to receive (e.g., be provided with a larger diameter than) sealing portion 28 of first member 20. In embodiments, sealing portion 38 may be configured to snap-fit onto sealing portion 28. In embodiments, second member 30 may include a flange 34. In other embodiments, second member 30 may be configured to receive a flange 34. Flange 34 may be configured to be pressed onto and/or snap-fitted with a portion of second member 30.

In embodiments, a method of assembling coupling 10 may include disposing elastomeric seal 80, and/or backup ring 90 within sealing portion 38 of second member 30, and/or disposing wave spring 100 around sealing portion 28 of first member 20. The method may then include sliding nut 50 and spring 70 into sleeve 60 and forming the end of sleeve 60 such that nut 50 and spring 70 are retained by sleeve 60. In embodiments, the method may include forming the end of sleeve 60 by pressing nut 50 and spring 70 onto sleeve 60 and/or snap fitting nut 50 and spring 70 with sleeve 60. By way of non-limiting example, the nut 50 may be configured to be snap-fitted onto the sleeve 60. The method may include inserting/sliding the spring 70 onto the sleeve 60. The method may then include pressing and/or snap-fitting the nut 50 into the spring 70 and the sleeve 60.

In embodiments, the method may then include inserting first member 20 into nut 50. First member 20 may then be connected to first fluid conduit 16 (e.g., it may be desirable, in certain embodiments, to dispose nut 50 and/or sleeve 60 at least partially around first member 20 prior to connecting first member 20 to a fluid conduit). In embodiments, such as generally illustrated in FIG. 2C, nut 50 and/or sleeve 60 may be connected to first member 20 by way of a drive wire 210. In other embodiments, nut 50 and/or sleeve 60 may be connected to first member 20 by a snap-ring, an e-clip, or other suitable mechanisms.

First member 20, nut 50, and sleeve 60 may then be disposed proximate second member 30 such that internal threads 54 of nut 50 may begin to engage external threads 40 of second member 30. An operator may then rotate sleeve 60 (e.g., without any tools), which may cause nut 50 to rotate (e.g., via corresponding external flat portions 52 and internal flat portions 62) and cause first member 20, nut 50, and sleeve 60 to move axially toward second member 30. As first member 20 and second member 30 move toward each other, one or more of elastomeric seal 80, backup ring 90, and wave spring 100 may at least partially compress. Upon complete assembly of coupling 10, such as generally illustrated in FIGS. 1, 11A, and 11B, tabs 64 of sleeve 60 may be completely received by and/or may snap into recesses 36 of second member flange 34, which may provide tactile, audible and/or visual feedback to the operator that assembly is complete. In embodiments, assembly may be completed with just a hand or hands of an operator, independent of any tools.

Figure 12A:
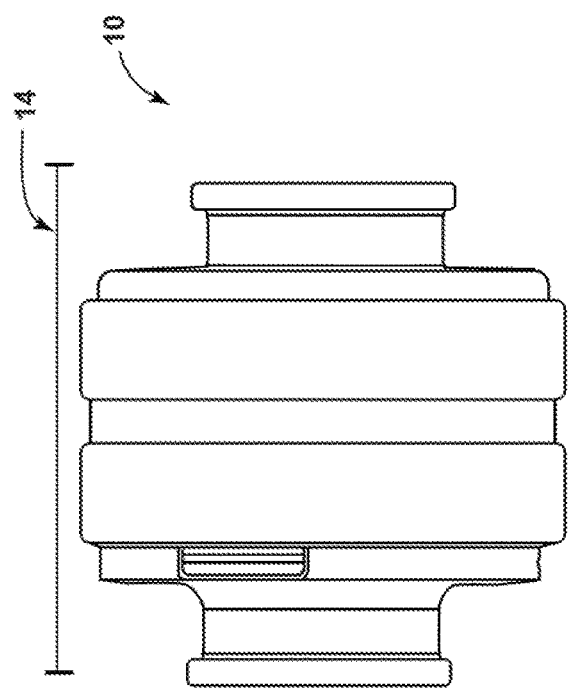
FIG. 12A is a side view of portions of a coupling, in accordance with an embodiment of the present disclosure.
Figure 12B:
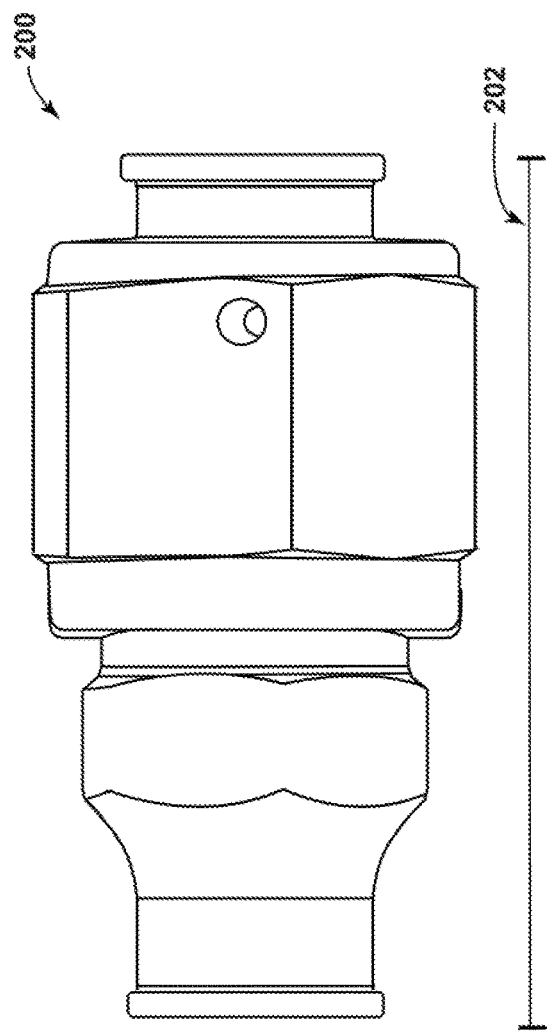
FIG. 12B is a side view of a conventional coupling.

In embodiments, such as generally illustrated in FIGS. 12A and 12B, coupling 10 may be smaller than conventional B-Nut couplings (e.g., such as conventional coupling 200 illustrated in FIG. 12B). For example, and without limitation, coupling 10 may include an axial length 14 that may be about 40% shorter (or even shorter) than the axial length 202 of conventional couplings 200 (e.g., a dash-8 conventional coupling 200 may include an axial length of 1.8275 inches and a dash-8 embodiment of coupling 10 may include an axial length of 1.068 inches). In embodiments, coupling 10 may include a lesser weight/mass than conventional couplings 200. For example, and without limitation, coupling 10 may include a weight/mass that is about 48% less than convention couplings (e.g., a dash-8 conventional coupling 200 may weigh about 0.164 pounds and a dash-8 embodiment of coupling 10 may weight about 0.086 pounds, or, in embodiments, less than 0.086 pounds).

It should be understood that descriptions of a spring (e.g., spring 70 and/or wave spring 100) may include one or more of a variety elements that may be configured to provide a biasing force, such as, for example, a coil spring, a leaf spring, a resilient element (e.g., a rubber bellows), and/or similar elements.

It should be understood that coupling 10 may be used in one or more of a variety of applications, including, without limitation, aerospace, automotive, and/or maritime/naval). It should also be understood that coupling 10 is not limited to a particular size and may be scaled for one or more of a variety of applications.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A fluid coupling, comprising:
   a first member configured for connection with a first fluid conduit;
   a second member configured for connection with a second fluid conduit;
   a nut disposed at least partially around the first member, the nut configured to engage the second member; and
   a sleeve configured to rotate the nut and cause or facilitate engagement between the nut and the second member;
   wherein at least a portion of a sealing portion of the first member is inserted into at least a portion of a sealing portion of the second member, and an elastomeric seal is disposed at least partially around the sealing portion of the first member in a radial direction and in the sealing portion of the second member; and the sleeve includes a tab configured to engage a recess of a flange of the second member.

2. The fluid coupling of claim 1, wherein the second member includes external threads configured for engagement with internal threads of the nut.

3. The fluid coupling of claim 1, wherein external flat portions of the nut correspond to internal flat portions of the sleeve.

4. The fluid coupling of claim 1, wherein the nut includes an internal curved portion.

5. The fluid coupling of claim 1, wherein the sleeve includes internal flat portions aligned with external flat portions of the nut, and rotation of the sleeve causes rotation of the nut via the internal flat portions and the external flat portions.

6. The fluid coupling of claim 1, wherein the tab and the recess of the flange of the second member are configured such that complete insertion of the tab into the recess provides at least one of tactile, audible, and visual feedback.

7. The fluid coupling of claim 6, including a spring configured to maintain the tab in the recess.

8. The fluid coupling of claim 1, including a backup ring configured to provide a fluid seal between the first member and the second member.

9. A fluid coupling, comprising:
   a first member configured for connection with a first fluid conduit;
   a second member configured for connection with a second fluid conduit;
   a nut disposed at least partially around the first member, the nut configured to engage the second member;
   a sleeve configured to rotate the nut and cause or facilitate engagement between the nut and the second member; and
   a spring configured to provide a biasing force in an axial direction between the nut and the sleeve;
   wherein at least a portion of a sealing portion of the first member is inserted into at least a portion of a sealing portion of the second member, and an elastomeric seal is disposed at least partially around the sealing portion of the first member in a radial direction and in the sealing portion of the second member.

10. The fluid coupling of claim 9, wherein the spring comprises a coil spring.

11. A fluid coupling, comprising:
    a first member configured for connection with a first fluid conduit;
    a second member configured for connection with a second fluid conduit;

a nut disposed at least partially around the first member, the nut configured to engage the second member;

a sleeve configured to rotate the nut and cause or facilitate engagement between the nut and the second member; and at least one of:
- a wave spring configured to provide a biasing force in an axial direction between a flange of the first member and an axial end of the sealing portion of the second member;
- a garter spring disposed at least partially around a sealing portion of the first member; and
- a drive wire connecting at least one of the nut and the sleeve with the first member.

12. The fluid coupling of claim 11, wherein the wave spring is electrically conductive and configured to electrically connect the first member and the second member.

13. The fluid coupling of claim 11, wherein the garter spring is configured to provide a biasing force in an axial direction between the first member and the second member.

14. A method of assembling a coupling, the method comprising:

providing a first member configured for connection with a first fluid conduit and a second member configured for connection with a second fluid conduit;

disposing an elastomeric seal within a sealing portion of the second member;

disposing a wave spring around a sealing portion of the first member;

inserting or providing a nut and a spring into a sleeve;

inserting the first member into the nut;

connecting the first member to a first fluid conduit;

disposing the first member, the nut, and the sleeve proximate a second member such that internal threads of the nut engage external threads of the second member;

connecting the first member and the second member; and wherein connecting the first member and the second member includes rotating the sleeve to cause the nut to rotate until tabs of the sleeve are completely received by recesses of a flange of the second member, and at least a portion of the sealing portion of the first member is inserted into at least a portion of the sealing portion of the second member such that the elastomeric seal is disposed at least partially around the sealing portion of the first member in a radial direction to create a seal between the sealing portion of the first member and the sealing portion of the second member.

15. The method of claim 14, wherein the rotating of the sleeve is performed independently of external tools.

* * * * *